United States Patent
Donoho

(10) Patent No.: US 8,720,106 B2
(45) Date of Patent: *May 13, 2014

(54) ELECTRIFIED BIRD DETERRENT DEVICE WITH CAVITY

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,223

(22) Filed: Nov. 7, 2012

(65) Prior Publication Data

US 2013/0061515 A1 Mar. 14, 2013

Related U.S. Application Data

(63) Continuation of application No. 13/365,535, filed on Feb. 3, 2012.

(60) Provisional application No. 61/543,221, filed on Oct. 4, 2011.

(51) Int. Cl.
*A01M 29/00* (2011.01)
*A01M 29/24* (2011.01)
*A01M 29/26* (2011.01)

(52) U.S. Cl.
USPC .......................................... 43/98; 43/1; 52/101

(58) Field of Classification Search
USPC ..................... 43/1, 98, 124; 52/101; 119/712; 340/573.2
See application file for complete search history.

(56) References Cited

U.S. PATENT DOCUMENTS

| | | |
|---|---|---|
| 1,976,721 A | 10/1934 | Gengler |
| 2,647,228 A | 7/1953 | Just |
| 3,294,893 A | 12/1966 | Shaffer |
| 3,320,354 A | 5/1967 | Marley et al. |
| 3,366,854 A | 1/1968 | Robinson |
| 3,622,685 A | 11/1971 | Crowl |
| 3,717,802 A | 2/1973 | Plevy et al. |
| 4,015,176 A | 3/1977 | Shanahan et al. |
| 4,111,400 A | 9/1978 | Enoksson |
| 4,186,512 A | 2/1980 | Berg |
| 4,274,123 A | 6/1981 | Rogers, Jr. |

(Continued)

FOREIGN PATENT DOCUMENTS

| | | |
|---|---|---|
| AU | 2004296785 | 6/2005 |
| CA | 2548474 | 6/2005 |

(Continued)

OTHER PUBLICATIONS

Flye-Bye Bird Control Products—www.flybye.com catalog product info.pdf, Shock Strip, last visited Nov. 6, 2012, http://www.flybye.com/catalog/product_info.php?cPath=2&products_id=203&osCsid=ajd88q0883dsg228ieeip67fq5.

(Continued)

*Primary Examiner* — David Parsley
(74) *Attorney, Agent, or Firm* — Fish & Tsang LLP

(57) ABSTRACT

An animal deterrent device includes an elongated carrier having an internal cavity. A conductive trace can be coupled to the carrier by a first fastener that extends from the conductive trace to the cavity, which prevents water from contacting the fastener and shorting the conductive trace.

12 Claims, 3 Drawing Sheets

(56) References Cited

U.S. PATENT DOCUMENTS

| | | |
|---|---|---|
| 4,299,048 A | 11/1981 | Bayes |
| 4,352,007 A | 9/1982 | Baker et al. |
| 4,471,561 A | 9/1984 | Lapierre |
| 4,475,141 A | 10/1984 | Antonevich |
| 4,494,733 A | 1/1985 | Olsson |
| 4,706,941 A | 11/1987 | Sherdan |
| 4,839,984 A | 6/1989 | Saunders et al. |
| 4,861,645 A | 8/1989 | Standing |
| 4,862,637 A | 9/1989 | Dressel |
| 4,949,216 A | 8/1990 | Djukastein |
| 5,007,196 A | 4/1991 | Saunders et al. |
| 5,031,353 A | 7/1991 | Gardiner |
| 5,036,166 A | 7/1991 | Monopoli |
| 5,049,704 A | 9/1991 | Matouschek |
| 5,095,646 A | 3/1992 | Bunkers |
| 5,096,162 A | 3/1992 | Cleveland |
| 5,107,620 A | 4/1992 | Mahan |
| 5,151,319 A | 9/1992 | Schoutteten |
| 5,158,039 A | 10/1992 | Clark |
| 5,253,444 A | 10/1993 | Donoho et al. |
| 5,433,029 A | 7/1995 | Donoho et al. |
| 5,570,537 A | 11/1996 | Black et al. |
| 5,850,808 A | 12/1998 | Burdick |
| 6,006,698 A | 12/1999 | Negre |
| 6,145,236 A | 11/2000 | King |
| 6,250,023 B1 | 6/2001 | Donoho |
| 6,283,064 B1 | 9/2001 | Djukastein et al. |
| 6,314,914 B1 | 11/2001 | Betzen |
| 6,332,262 B1 | 12/2001 | Sakamoto |
| 6,371,054 B1 | 4/2002 | Celata et al. |
| 6,472,602 B1 | 10/2002 | Pokrandt |
| 6,718,701 B2 | 4/2004 | Riddell |
| 6,775,950 B2 | 8/2004 | Donoho |
| 6,834,846 B2 | 12/2004 | Robbins, III |
| 6,878,883 B1 | 4/2005 | Rauckman |
| 6,925,748 B2 | 8/2005 | McGill et al. |
| 6,928,768 B1 | 8/2005 | Snow |
| 6,933,446 B1 | 8/2005 | Waldorf et al. |
| 7,020,995 B1 | 4/2006 | Snow |
| 7,036,278 B1 | 5/2006 | Donoho |
| 7,075,015 B1 | 7/2006 | Rauckman |
| 7,243,465 B2 | 7/2007 | Donoho |
| 7,249,436 B2 * | 7/2007 | Ravenelle et al. ............ 43/98 |
| 7,276,665 B1 | 10/2007 | Rauckman |
| 7,299,586 B2 | 11/2007 | Lawson, Jr. |
| 7,351,913 B2 | 4/2008 | Waldorf et al. |
| 7,481,021 B2 | 1/2009 | Riddell |
| 7,596,910 B1 | 10/2009 | Donoho |
| 7,679,000 B2 | 3/2010 | Rauckman |
| 7,772,499 B2 | 8/2010 | Rauckman |
| 7,802,396 B2 | 9/2010 | Donoho |
| 7,802,405 B1 | 9/2010 | Donoho et al. |
| 7,937,885 B2 | 5/2011 | Donoho |
| 7,941,977 B2 | 5/2011 | Donoho |
| 8,015,747 B2 | 9/2011 | Donoho |
| 8,020,340 B2 | 9/2011 | Donoho |
| 8,065,842 B2 | 11/2011 | Donoho et al. |
| 8,191,303 B2 | 6/2012 | Donoho |
| 8,196,340 B2 | 6/2012 | Donoho |
| 8,196,341 B2 | 6/2012 | Donoho |
| 2001/0048053 A1 | 12/2001 | Donoho |
| 2002/0092481 A1 | 7/2002 | Spooner |
| 2003/0208967 A1 | 11/2003 | Riddell |
| 2004/0173786 A1 | 9/2004 | Robbins |
| 2004/0255837 A1 | 12/2004 | Donoho |
| 2005/0132635 A1 | 6/2005 | Riddell |
| 2005/0150469 A1 | 7/2005 | Wolfgram |
| 2006/0032111 A1 | 2/2006 | Willard et al. |
| 2006/0207195 A1 | 9/2006 | Donoho |
| 2007/0180781 A1 | 8/2007 | Donoho |
| 2007/0214710 A1 | 9/2007 | Donoho |
| 2007/0220802 A1 | 9/2007 | Donoho |
| 2008/0172817 A1 | 7/2008 | Riddell |
| 2009/0126651 A1 | 5/2009 | Riddell |
| 2009/0165281 A1 | 7/2009 | Larsen |
| 2009/0249710 A1 | 10/2009 | Donoho |
| 2009/0260272 A1 | 10/2009 | Donoho |
| 2009/0261180 A1 | 10/2009 | Donoho et al. |
| 2010/0180490 A1 | 7/2010 | Donoho |
| 2011/0030621 A1 | 2/2011 | Donoho |
| 2011/0067646 A1 | 3/2011 | Donoho |
| 2011/0146589 A1 | 6/2011 | Donoho |
| 2011/0214339 A1 | 9/2011 | Donoho |
| 2011/0314724 A1 | 12/2011 | Donoho |
| 2012/0030989 A1 | 2/2012 | Donoho |
| 2012/0031016 A1 | 2/2012 | Donoho |
| 2012/0151823 A1 | 6/2012 | Donoho et al. |
| 2012/0224294 A1 | 9/2012 | Donoho |
| 2012/0241214 A1 | 9/2012 | Donoho |

FOREIGN PATENT DOCUMENTS

| | | |
|---|---|---|
| CN | 102356699 | 2/2012 |
| DE | 3930012 A1 | 3/1991 |
| DE | 202010 | 2/2012 |
| EP | 0592054 | 4/1994 |
| EP | 1314355 | 5/2003 |
| GB | 1207496 | 10/1971 |
| JP | 08-256666 | 10/1996 |
| JP | 11-346634 | 12/1999 |
| JP | 2006-340691 | 12/2006 |
| JP | 2007-000142 | 1/2007 |
| WO | 84/04022 | 10/1984 |
| WO | 93/20689 | 10/1993 |
| WO | 95/08915 | 4/1995 |
| WO | 96/08140 | 3/1996 |
| WO | 00/21363 | 4/2000 |
| WO | 2004/021780 | 3/2004 |
| WO | 2005/055865 A2 | 6/2005 |
| WO | 2005/055865 A3 | 6/2005 |
| WO | 2009/129412 | 10/2009 |
| WO | 2010/083516 | 7/2010 |
| WO | 2012/040009 | 3/2012 |

OTHER PUBLICATIONS

Flye-Bye Bird Control Products—www.flybye.com catalog product info.pdf, Shock Strip, enlarged picture last visited Nov. 6, 2012,, http://www.flybye.com/catalog/popup_image.php?pID=203.

Shock Strips(TM) D&S Specialty Products, Inc., Kirkland, WA, ShockStrip product description—last visited Nov. 6, 2012, http://www.flyebye.com/shockstrip.pdf.

\* cited by examiner

ELECTRIFIED BIRD DETERRENT DEVICE WITH CAVITY

This application is a continuation application of U.S. patent application Ser. No. 13/365,535 filed on Feb. 3, 2012, which claims the benefit of priority to U.S. provisional application having Ser. No. 61/543,221 filed on Oct. 4, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is bird deterrent devices.

BACKGROUND

There are numerous animal deterring devices known in the art, and many of those use electric current to deter, and in some case even kill birds and other relatively small animals. For example, where a relatively large structure is to be protected, a blanket can be configured to include a plurality of vertically arranged and spaced apart electrodes as described in U.S. Pat. No. 6,925,748. While such devices may protect a relatively large area, numerous disadvantages remain. Among other things, pooling of water must be avoided at all times to allow for continuous operation. Moreover, as such devices are typically flexible, inadvertent short circuiting may occur by folding or bending a portion of the blanket.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Other known electrified devices include those described in U.S. Pat. No. 4,015,176 and EPO no. 1314355 in which a string-shaped carrier includes conductive traces embedded or attached to the carrier. Similarly, string-shaped structures may be formed from braided wire that further includes insulator disks as described in U.S. Pat. No. 5,031,353. While such devices are generally simple to manufacture and operate, various difficulties remain. Among other problems, such devices often fail to operate properly when moisture or rain runs along the wire, or where droppings are deposited on the wire. Similar disadvantages are observed in devices that have a rail with partially embedded conductive traces from which raised conductive tabs protrude as shown in U.S. Pat. No. 6,006,698, or in devices having a rail with two elevated conductive traces as described in U.S. pat. appl. no. 2005/0132635. Such devices are particularly sensitive to puddling or fecal contamination.

In still further known electrified deterring devices, conductive traces are mounted to an elevated carrier portion that includes spaces to allow for drainage and flexible installation as shown in U.S. Pat. Nos. 6,283,064 and 6,928,768. While such devices are often more reliable than known devices when exposed to moisture or droppings, other disadvantages arise. For example, due to the raised position of the wires, installation is frequently esthetically less pleasing than relatively flat rail-type structures. Moreover, positioning of the wires is at a fixed distance and in a manner that will allow at least some birds to perch in a position in which the bird will not receive the electrical impulse or current.

U.S. Pat. No. 7,481,021 discusses that the conductors can be sewn to the base to facilitate bending of the conductor and base. However, this is problematic because the stitches disposed on the bottom surface of the base can come into contact with water, which can seep up the thread and cause the conductors to short. While this problem can be eliminated by disposing the stitches in glue troughs that are filled with adhesive, e.g., U.S. Pat. Nos. 8,015,747 and 8,020,340, there may be situations where glue troughs are not desirable.

Thus, while there are numerous devices and methods for deterring animals, and especially birds are known in the art, all or almost all of them suffer from various disadvantages. Thus, there is still a need for new configurations and methods for bird deterrents.

SUMMARY OF THE INVENTION

The inventive subject matter provides apparatus, systems and methods for animal deterrent devices having at least one electrically conductive trace coupled to an elongated carrier that includes an internal cavity.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

In preferred embodiments, the conductive trace can be coupled to the elongated carrier by a first fastener that extends from the conductive trace to the cavity. In this manner, the first fastener can extend back and forth from the carrier to the cavity resulting in the conductive trace and cavity each having a plurality of stitches. By disposing the stitches within the cavity rather than on a bottom surface of the carrier, shorting of the conductive trace can advantageously be prevented because the cavity insulates the stitches from contact with water that may pool at the carrier's bottom surface. Water can thus be prevented from wicking or seeping up the fastener and contacting the conductive trace.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including reducing the likelihood of the conductive trace being shorted as a result of water pooling beneath the deterrent device.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
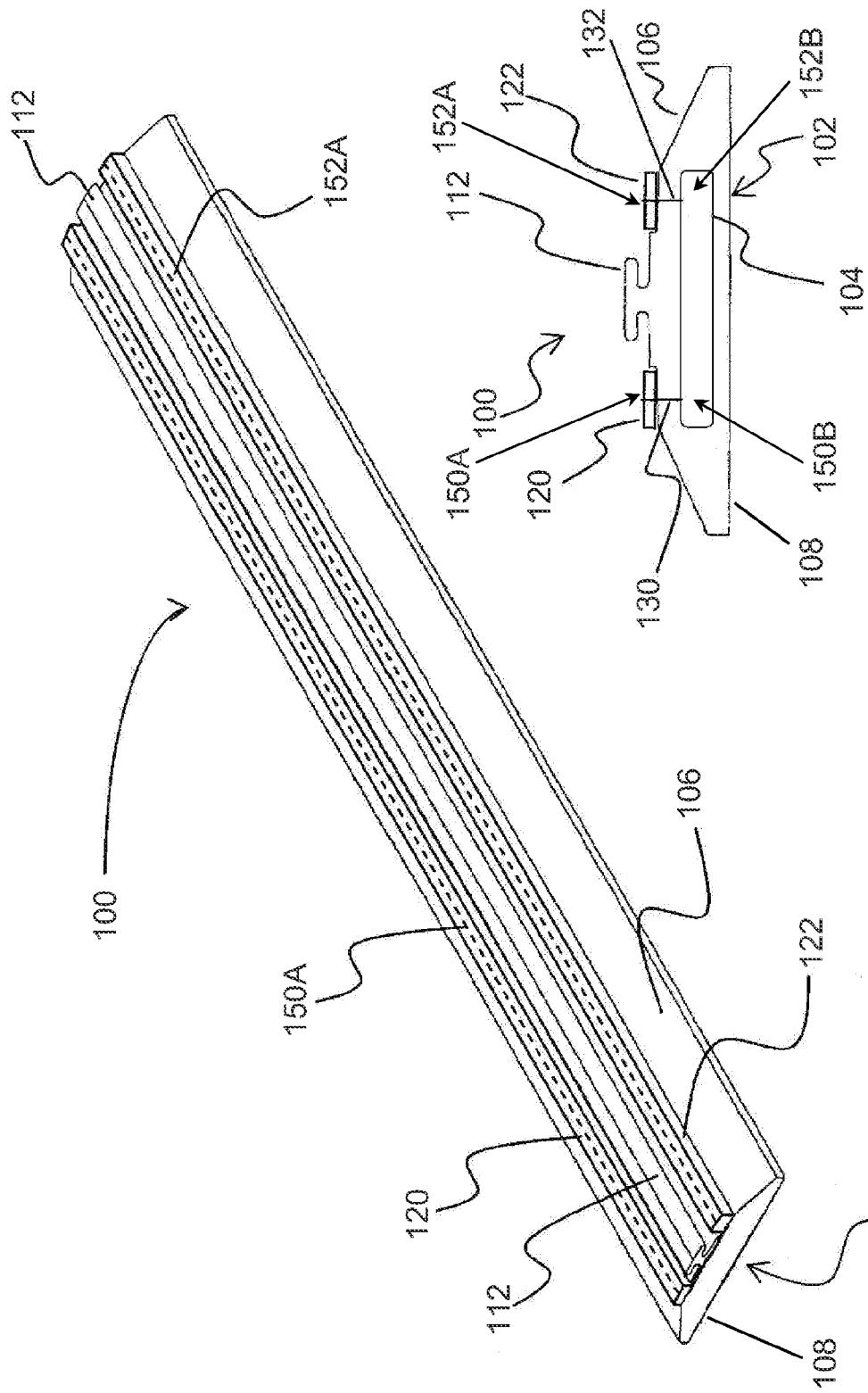
FIG. 1A is a perspective view of one embodiment of a bird deterrent device.
FIG. 1B is a horizontal cross-section view of the bird deterrent device of FIG. 1A.

In FIGS. 1A-1B, an animal deterrent device 100 is shown having an elongated carrier 102, to which conductive traces 120 and 122 can be coupled using any commercially suitable fastener(s) including, for example, glues and other adhesives, metal and plastic staples, cotton, synthetic or other types of thread, and other mechanical fasteners, and any combination(s) thereof. Carrier 102 preferably includes at least one internal cavity 104. Preferably, the cavity 104 is hermetically sealed within carrier 102, although the cavity 104 can alternatively include one or more outlets (not shown). Cavity 104 is preferably hollow, but in alternative embodiments at least a portion of the cavity 104 can include a low-density material including, for example, foam and aerogel. Such material can advantageously assist in maintaining a structure of the cavity 104.

In other contemplated embodiments, cavity 104 can include struts or other means of support such that cavity 104 can maintain its size and dimension. It is contemplated that cavity 104 can be of any commercially size and dimension, and preferably is sized and dimensioned such that conductive traces 120 and 122 can be sewn to the carrier 102 using one or more threads that extends from conductive trace 120 or 122 to cavity 104. Carrier 102 can alternatively include multiple cavities. In preferred embodiments, cavity 104 extends substantially the length of the carrier 102, but alternatively could extend along only a portion thereof. In other embodiments, the carrier could include a plurality of cavities or pockets disposed about a length of the carrier 102.

The conductive traces 120 and 122 can be knitted, braided or otherwise configured from a conductive material such that the traces 120 and 122 can conduct current. An exemplary embodiment of knitted conductors is described in U.S. patent application Ser. No. 12/689,406 filed on Jan. 19, 2010. In other contemplated embodiment, the conductive traces could be formed from an extruded, conductive polymer(s).

It is contemplated that the elongated carrier 102 can be manufactured from a thermoplastic elastomer or rubber-containing compound, or other commercially suitable materials or combinations thereof. For example, the carrier could be fabricated from numerous materials, including natural and synthetic materials, wood, glass, metals and metal alloys, and any commercially suitable material(s) and combination(s) thereof. Especially preferred materials include those that provide sufficient flexibility to the carrier 102 to allow the carrier 102 to conform to uneven surfaces. Most preferably, carrier 102 is soft enough to be manually deformed. It is also noted that where the carrier is especially pliable, a desired form may be retained by inclusion of a more resilient element within or coupled to the carrier 102. For example, contemplated carriers may include a metal wire or other deformable element that assists the carrier to maintain a desired configuration. Furthermore, it is generally preferred that the carrier material is non-conductive. However, in alternative aspects, carrier 102 may also be made from, or include a conductive material. In such devices, it is then contemplated that only one conductive trace may be needed, and that such trace is typically coupled to the carrier via an insulator.

In preferred embodiments, the carrier 102 is relatively flat (i.e., has a width and length that is larger than the height) such that the device 100 can be bent, or even provided in a rolled-up configuration. However, the particular width and height will typically be determined by the size of bird or other animal that is to be deterred. Thus, and most commonly, carrier 102 will be configured such that entire device 100 has a height to width ratio between 1:5 and 1:2, and more typically between 1:4 and 1:3. For example, suitable carriers may have a width between 1 cm and 10 cm, more typically between 2 cm and 7 cm, and most typically between 3 cm and 5 cm. The length of such devices is generally determined by the desired overall length of the device or device segment and may therefore vary between several centimeters to several meters and even longer. The height of contemplated devices will generally be between 1 mm and 3 cm, and more typically between 3 mm and 1 cm. In further contemplated embodiments, carrier 102 may include one or more cutouts (not shown) sized and configured to allow for side-to-side flexing of the carrier 102. For example, such cutouts may be formed to allow positioning the carrier in a 90 degree angle with a radius of less than 20 cm, more preferably less than 15 cm, and most preferably less than 10 cm.

In preferred embodiments, each of the conductive traces 120 and 122 can be coupled to carrier 102 by threads 130 and 132, respectively. The conductive traces 120 and 122 may be coupled to the carrier 102 on a horizontal surface or an angled surface 106, and are preferably at least partially disposed over cavity 104. In especially preferred embodiments, the first conductive trace 120 is coupled to the carrier 102 by a thread 130 that extends from the first conductive trace 120 to the cavity 104, such that each of the first conductive trace 120 and the cavity 104 has a plurality of stitches 150A and 150B, respectively. In a similar fashion, the second conductive trace 122 can be coupled to the carrier 102 by a second thread 132 that extends from the second conductive trace 122 to the cavity 104, such that each of the second conductive trace 122 and the cavity 104 has a plurality of stitches 152A and 152B, respectively. It is contemplated that one or both of threads 130 and 132 may extend through only a portion of conductive traces 120 and 122, respectively, or alternatively, extend from a first end to a second end of conductive traces 120 and 122. It is further contemplated that the fastener may extend only to an edge (e.g., roof) of the cavity rather than extend into the cavity.

Sewing conductive traces 120 and 122 to the carrier 102 advantageously allows the conductive traces 120 and 122 to flex as the carrier 102 flexes. Furthermore, sewing the conductive traces 120 and 122 to the cavity 104 rather than a bottom surface 108 of the carrier 102 advantageously insulates the plurality of stitches 150B and 152B from coming into contact with water that could pool at the bottom surface 108. In this manner, the water is prevented from seeping up the threads 130 and 132 and shorting the conductive traces 120 and 122.

The first and second conductive traces 120 and 122 are typically spaced apart at a distance that allows formation of an electric circuit when a foot of a bird (e.g., an adult pigeon, an adult seagull) rests on the device 100. Therefore, and depending on the particular bird or other animal or pest to be deterred, suitable distances between the first and second conductive traces 120 and 122 will be between 5 mm and 2 cm, and more typically between 7 mm and 1.5 cm.

In still further preferred aspects, the first and second conductive traces 120 and 122 are parallel to an arc suppressor 112, and/or at least one of the first and second conductive traces 120 and 122 are continuous along substantially (+/− 5%) the entire length of the carrier 102. Where desirable, at one part of the carrier 102 is angled to a degree such that when the device 100 is installed on a horizontal surface, water runs off the angled surface 106. Depending on the particular configuration, the angled surface 106 may include the portion of the carrier 102 to which the trace is coupled, and/or a portion between a conductive trace and the arc suppressor 112 or the outer edge of the carrier 104.

Carrier 102 can further include an arc suppressor 112 that separates the traces 120 and 122 from one another. It is generally preferred that the arc suppressor 112 is continuous along the length of the carrier. While there are numerous configurations are contemplated for the arc suppressor 112, it is generally preferred that the arc suppressor increases the creep distance between the conductive traces 120 and 122 at least 1.5 times, more typically at least 1.7 times, even more typically at least 2.0 times, and most typically at least 2.2 times, thereby preventing all or almost all circumstances where moisture, dew, or rain may cause short-circuiting.

As used herein, the term "creep distance" refers to a distance that is measured between two points on a body when following the shortest path between those points along the surface of that body. As also used herein, the term "umbrelloid shape" refers to any shape of an element that is coupled to the device where that element has a downward facing surface portion when the device is installed on a horizontal surface. Most typically, the downward facing portion is contiguous with an upward facing portion, and the element will therefore have a sharp angled or rounded edge from which water or other fluids can drip off. Viewed from a different perspective, elements with umbrelloid shape will generally have a downward facing portion and an upward facing portion that are either substantially parallel (+/−15 degrees), or form an angle between 15 and less than 90 degrees. Exemplary umbrelloid shapes include a T-shape, a stemmed inverted U-shape, and a stemmed inverted V-shape.

In especially preferred aspects, the arc suppressor 112 has an umbrelloid shape and a height to width ratio between 1:10 and 1:1, and more typically between 1:6 and 1:1. For example, contemplated arc suppressors generally include stemmed structures in which a first generally vertical element carries a horizontal or curved element to form a T-shape, a stemmed inverted V-shape, a stemmed inverted U-shape, or an otherwise stemmed structure that has at least one generally horizontally extending protrusion. Depending on the particular shape, it should be appreciated that a vertical gap will be formed between at least part of the arc suppressor 112 and the portion of the carrier 102 to which the conductive traces 120 and 122 are coupled, and that such gap will assist in breaking a layer of conductive material that extends across the device 100.

It should be noted that the shape of the arc suppressor 112 can generate a space that is protected from contact with conductive material falling vertically (and even from falling at an angle of up to 45 degrees, and more) onto the device 100. Still further, it should be noted that the shape of the arc suppressor 112 can also provide for a vertical clearance (i.e., empty space between the shortest vertical distance between at least one of the conductive traces 120 and 122 and the top surface of the device 100 or the arc suppressor 112) that is effective in disrupting a conductive film, flow, and/or layer between the conductive traces 120 and 122.

Figure 2:
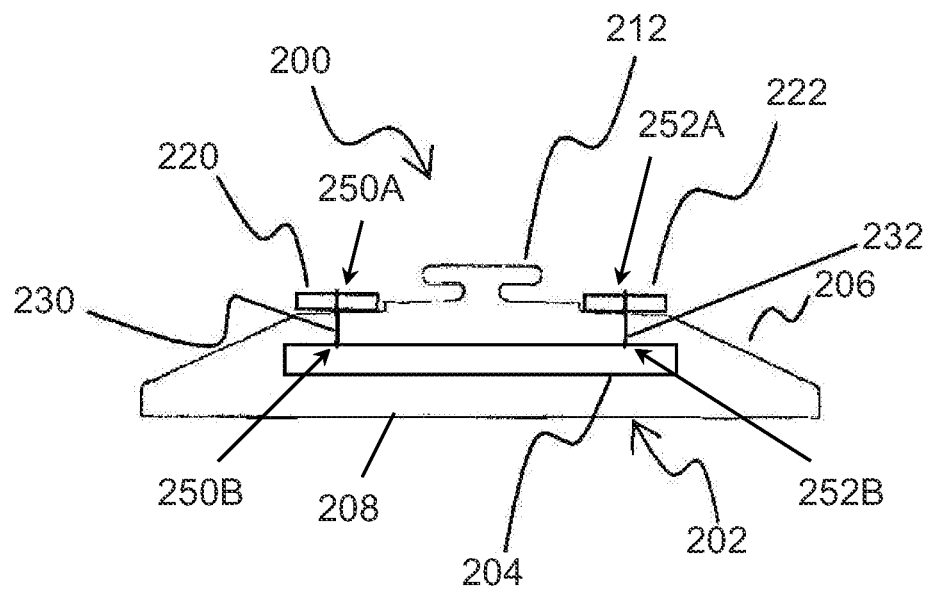
FIGS. 2-5 are horizontal cross-section views of various embodiments of bird deterrent devices.

FIG. 2 illustrates another embodiment of a bird deterrent device 200 having a cavity 204 with a square-shaped horizontal cross-section. With respect to the remaining numerals in FIG. 2, the same considerations for like components with like numerals of FIG. 1 apply.

Figure 3:
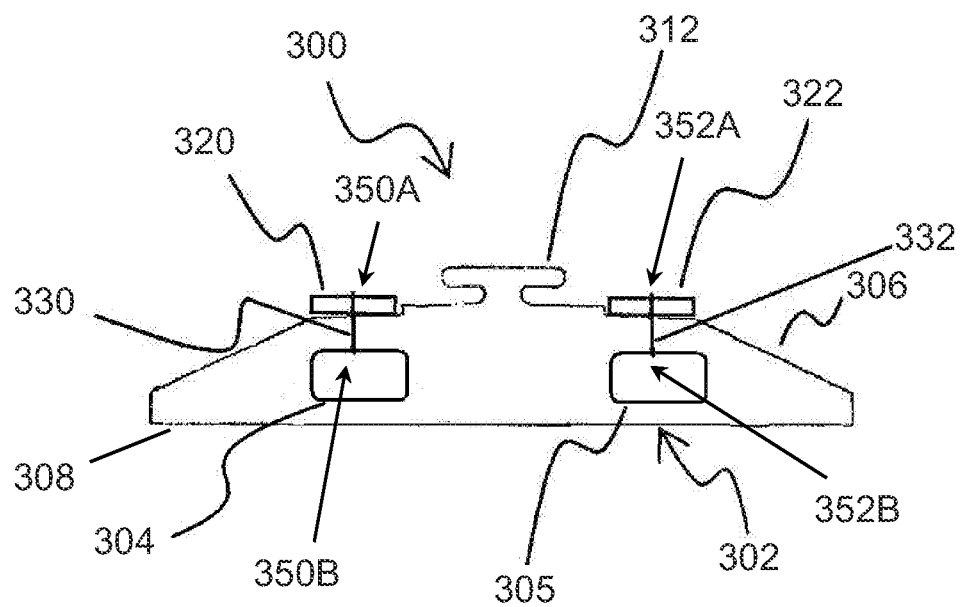

In FIG. 3, yet another embodiment of a bird deterrent device 300 is shown having first and second cavities 304 and 305, which are at least partially disposed beneath the first and second conductive traces 320 and 322, respectively. Although two cavities are shown, it is contemplated that the device 300 can include a single cavity or three or more cavities depending upon the specific application.

In preferred embodiments, each of the conductive traces 320 and 322 can be coupled to carrier 302 by threads 330 and 332, respectively. In especially preferred embodiments, the first trace 320 is coupled to the carrier 302 by a thread 330 that extends from the first trace 320 to the first cavity 304, such that each of the first trace 320 and the first cavity 304 has a plurality of stitches 350A and 350B, respectively. In a similar fashion, the second trace 322 can be coupled to the carrier 302 by a second thread 332 that extends from the second trace 322 to the second cavity 305, such that each of the second trace 320 and the second cavity 305 has a plurality of stitches 352A and 352B, respectively. With respect to the remaining numerals in FIG. 3, the same considerations for like components with like numerals of FIG. 1 apply.

Figure 4:
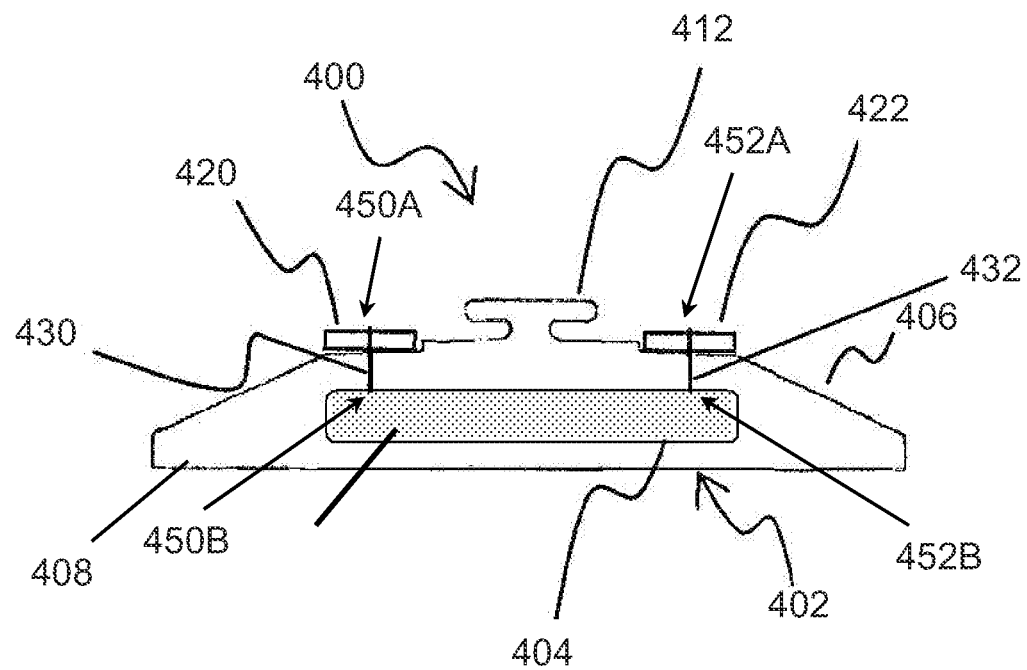

FIG. 4 illustrates still another embodiment of a bird deterrent device 400 having a carrier 402 with a cavity 404 that is filled with a low-density material 409. Although preferred low-density materials include foam or aerogel, any commercially suitable material(s) could be used having a low density, such that the fasteners 430 and 432 can be inserted through at least a portion of the low-density material 409. With respect to the remaining numerals in FIG. 4, the same considerations for like components with like numerals of FIG. 1 apply.

Figure 5:
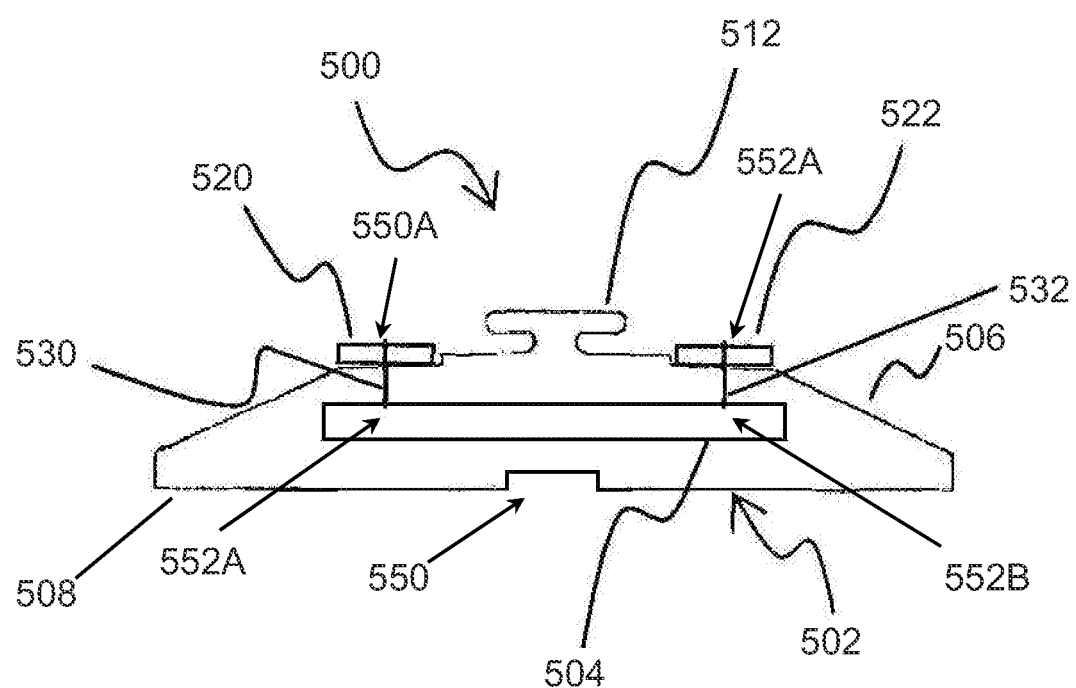

In FIG. 5, another embodiment of a bird deterrent device 500 having a carrier 502 that includes a cavity 504 and a glue trough 550 disposed on a bottom surface 508 of the carrier 502. The glue trough 550 preferably extends along a length of the carrier 502, and is configured to receive glue or other adhesive(s) to adhere the device 500 to a surface. Although device 500 is shown having a single glue trough 550, it is contemplated that device 500 could include two or more glue troughs, or a pattern of grooves defining treads, such as that described in U.S. provisional application having Ser. No. 61/543,253 filed on Oct. 4, 2011. With respect to the remaining numerals in FIG. 5, the same considerations for like components with like numerals of FIG. 1 apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An animal deterrent device, comprising:
   an elongated base having a cross section including an upper portion with a top and bottom surface, and a lower portion disposed underneath the bottom surface, wherein the upper and lower portions are coupled enclosing an internal cavity that has upper and lower surfaces, and wherein the bottom surface of the upper portion comprises the upper surface of the internal cavity, and wherein the lower surface of the internal cavity is above the lower portion of the base;

a first conductive trace extending perpendicular to the cross section along the top surface of the upper portion;

a first fastener that couples the first conductive trace on to the top surface at a first point on the top surface and extends from the first conductive trace through the upper portion to a second point on the bottom surface of the upper portion, wherein the second point is on an upper surface of the internal cavity; and wherein the lower portion is disposed underneath the second point on the bottom surface such that the lower portion insulates the first fastener at the second point.

2. The device of claim 1, further comprising a second conductive trace coupled to the top surface and extending parallel to the first conductive trace.

3. The device of claim 1, wherein the first conductive trace is sewn to the elongated base.

4. The device of claim 1, wherein the cross section includes a center support connecting the upper and lower portions of the elongated base.

5. The device of claim 2, wherein the first conductive trace and the second conductive trace are attachable respectively to positive and negative terminals of a power source.

6. The device of claim 1, wherein the cross section includes a center support extending downwardly from the upper portion of the base.

7. The device of claim 1, wherein the first conductive trace comprises a braided wire.

8. The device of claim 7, wherein the braided wire comprises some strands of a conductive material and other strands of a non-conductive material.

9. The device of claim 1, wherein the internal cavity comprises a hollow, interior portion of the carrier.

10. The device of claim 1, wherein the internal cavity is at least partially disposed beneath the first conductive trace.

11. The device of claim 4, wherein the carrier comprises first and second internal cavities disposed on opposite sides of the center support.

12. The device of claim 11, further comprising:
a second conductive trace coupled to the top surface and extending parallel to the first conductive trace; and
wherein the first and second internal cavities are at least partially disposed beneath the first and second conductive traces, respectively.

* * * * *